May 27, 1952  C. W. TURBYFILL  2,598,320
ADJUSTABLE CONTAINER
Filed Aug. 2, 1948  2 SHEETS—SHEET 1
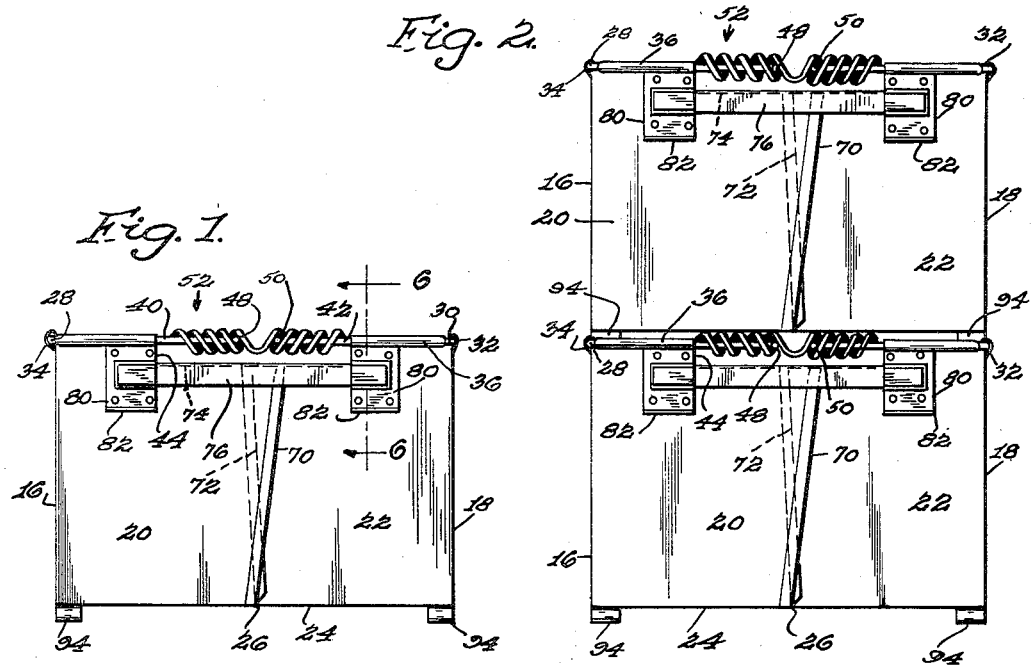
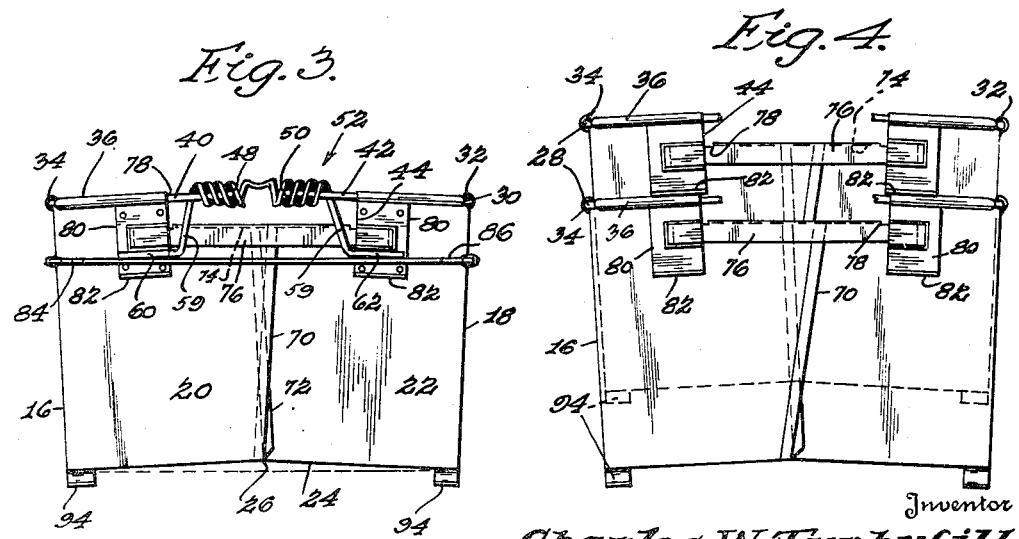
Inventor
Charles W. Turbyfill
By Robert van Sickler May 27, 1952 — C. W. TURBYFILL — 2,598,320
ADJUSTABLE CONTAINER
Filed Aug. 2, 1948 — 2 SHEETS—SHEET 2
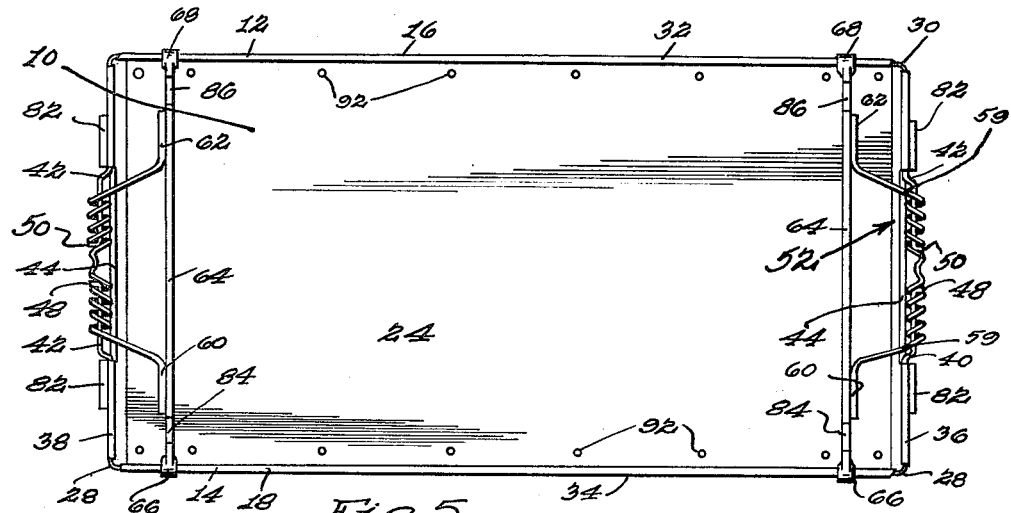
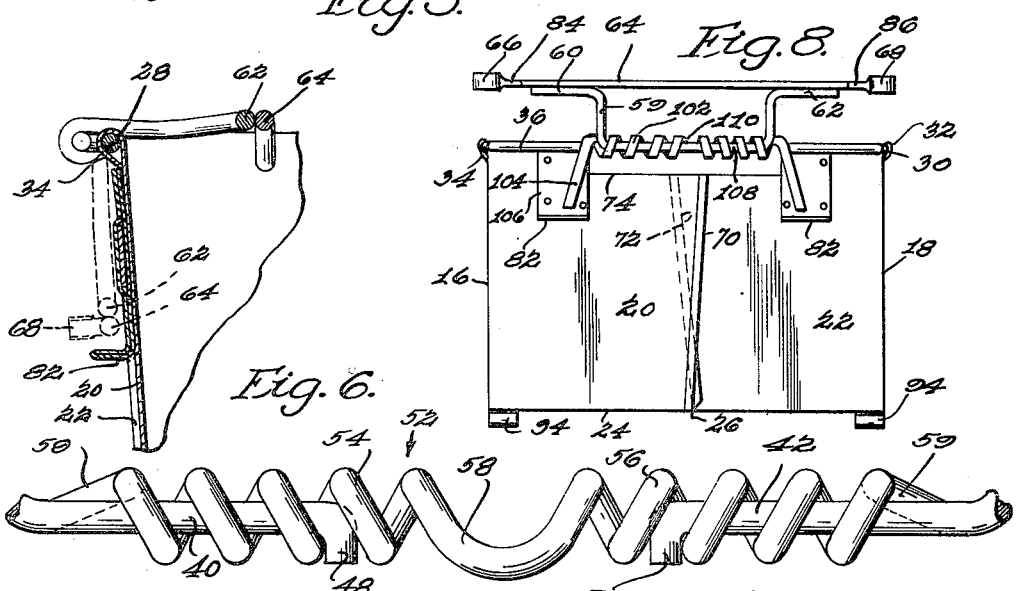
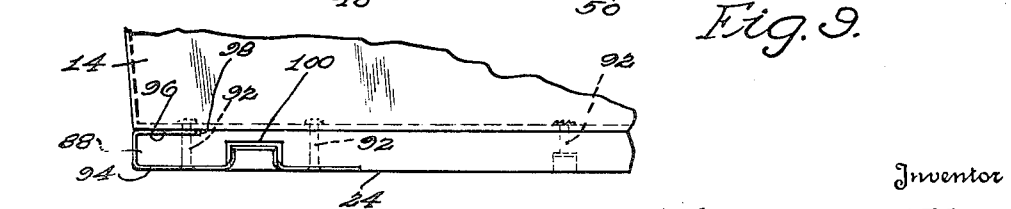
Inventor
Charles W. Turbyfill
By Robert Traux Sickler Patented May 27, 1952

2,598,320

UNITED STATES PATENT OFFICE 2,598,320

ADJUSTABLE CONTAINER

Charles W. Turbyfill, Marshall, Tex.

Application August 2, 1948, Serial No. 42,083

6 Claims. (Cl. 220—97)

This invention relates to adjustable containers, but more particularly to the expansible type adapted to be nestled within each other when empty, and when filled with articles to be readily stacked upon each other.

Although the container is primarily adapted for the reception of loaves of bread, it is apparent that the container lends itself to the reception of numerous articles and commodities. In the handling of freshly baked loaves of bread, particularly where immediate delivery is required, it is important that the loaves be placed in containers sufficiently large to contain the maximum of loaves placed on ends without undue pressure being exerted upon the bottom of the loaves and with disfigurement reduced to a minimum.

In the use of conventional rectangular boxes or containers, the deliveryman would often find when he arrived at his point of delivery that the loaves of the freshly baked bread had settled to such an extent that they were tightly wedged in the container and it was necessary to disfigure at least one loaf of each layer in order to remove them. This settling of the loaves filled the container so that the deliveryman could not get his fingers between the loaves and the sides of the container.

The conventional tapered box of the type having the container sides and ends tapering downwardly and inwardly from the top met with similar objections and criticism. With this type of container it was found that the upper layer of loaves had settled in their wrappers to such an extent that when removed, it appeared that short loaves had been used. While the tapered container permits of comparative easy loading and removal of the bread, the objections have been that the loaves are not uniform in length nor is a neat, full appearance obtained, so necessary from a selling point of these articles.

It is important, therefore, in a container for loaves of bread and the like, that the containers be of such construction and design as to house a maximum number of loaves and still prevent shifting or sliding that would distort or disfigure. Further, it is desirous that the container be capable of expansion to enable easy removal of the bread from the container. When bread is used in containers described below, regardless of the extent of the jarring or jolting of the vehicle in which the containers have been placed, the loaves will be uniform in size and retain the original shape as when taken from the baking oven.

It is an object of this invention to provide a container for loaves of bread and the like that may be placed one upon the other in interlocked relationship, the bottom of one container engaging the top of the one immediately below in such a way as to preclude sliding or separating.

Another object is to provide containers having sides adapted to be adjusted from their normally closed parallel relationship to an open position whereby the sides assume a downward inclination sufficient to enable them to be nestled within each other when empty but not to such an extent as to make it difficult to effect separation.

A further object is to provide a container for loaves of bread and the like wherein the sides may be readily expanded to expedite the easy removal of the bread therefrom.

An additional object of this invention is to provide a container for loaves of bread and the like adapted to be expanded by means of a screw mechanism located at each end and operated by a single stroke or throw of this mechanism.

Still another and further object is to provide means for strengthening the container and yet permit of easy operation of the expanded mechanism.

Other objects and advantages may be apparent from the following specifications, appended claims, and drawings in which:

Figure 1 is an end elevation of the container in closed position;

Figure 2 is an end elevation of two containers in closed position in stacked relationship;

Figure 3 is a similar end view of the container in open position;

Figure 4 is a view similar to Figure 2 except the containers are shown in open nestled position, the operating mechanism being eliminated;

Figure 5 is a top plan view of the container in closed position;

Figure 6 is a fragmentary sectional view taken on the line 6—6 of Figure 1 with one of the operating mechanisms shown in both open and closed position;

Figure 7 is a fragmentary elevation of a bottom corner of the container to indicate the protective or runner construction;

Figure 8 is an end elevation of a modification of the operating mechanism indicating a somewhat reversal of the elements accomplishing the same objectives, and Figure 9 is an enlarged fragmentary top plan view of the coil operating or adjusting mechanism.

In the drawings, the numeral 10 refers generally to the container of substantially rectangular shape which conforms to a convenient area or volume to permit of the uniform stacking and positioning of loaves of bread. It is to be noticed that the subject design incorporates the nesting features of tapered container walls and the straight side wall box requiring the minimum of space in shipment when the container is filled. The advantages of these two features are embodied in the subject construction having permanently tapered end and inclinable side walls.

The container 10 is mainly composed of two opposed shells 12 and 14 separated at their ends, and each shell comprises half of each end of the container and one full side. The two sides are indicated at 16 and 18, and the end portions at 20 and 22. The two half shells 12 and 14 are secured to a bottom 24 to form the box or container 10. However, the body blanks remain divided and unattached at points opposite each other. This construction permits the side walls 16 and 18, by a flexing of the bottom 24 along a line at or near the center 26 to incline inwardly, outwardly or to a vertical position, but holds the box ends in a rigid position in relation to each other. Each half body portion is formed so that when the corner bend is made it is done so as to cause the end sections 20 and 22 on each shell to be permanently inclined outwardly at the top. In viewing a half body section from an end view, as in Figure 1, it will be noticed that the half-end section has been formed along the top and bottom so as to be in parallel relationship and a horizontal position when the side walls are in a vertical position.

Although other materials of varying sizes may be used, the top framing members, which comprise two ¼" round bars 28 and 30, are securely attached to the top edges 32 and 34 of each shell side by bending or crimping the top edges over the bars and against the side walls. Similarly, the top edges 36 and 38 of the ends 20 and 22 are bent over the right angular portions 40 and 42 of the bars 28 and 30, partially across the end portions. It is to be noticed that these bar portions 40 and 42 are not attached to the end walls 20 and 22 in the central portion of the container as cut-out portions 44 and 46 are provided at these locations to accommodate the operating or adjusting mechanisms. The unattached portions 40 and 42 have their ends 48 and 50 bent at right angles for a purpose to be subsequently explained. The framing members include the bar portions 28, 30, 40 and 42 ending with the right angular thread followers 48 and 50.

The two top framing members, as stated above, are securely fastened along the top edge of each half-body section and are left unattached and spaced from each other, centrally of the container ends. Although other sizes may be used, the present construction provides a ¼" round rod that has been coiled about a ¼" mandrel to about 6½" of completed coil. This coil 52 is wound half with one helix 54, and the other half 56 with opposite helix, and connected by a central portion 58. It is to be noticed that the wire is of a length so that the elongations 59 of the coil are long enough so as to continue away from the coil on the same side of the coil and in the same plane for the desired distance. These elongations terminate in ends 60 and 62 and are attached to a stacking bar 64 extending across the container and having saddles or clamps 66 and 68 adapted to engage the top edges 32 and 34 of the container side walls 16 and 18. These stacking bars 64 further serve as handles to facilitate the operation of the coils 52.

The coil mechanism 52 is wound so that the spacing between the individual coils are approximately the same as the diameter of the thread followers 48 and 50. The two ends of the opposing framing members are started into opposite ends of the coil, with the right angular portions 48 and 50 acting as threads. The reversely coiled wire, by turning over and over as in a common turnbuckle, draws the two framing members 40 and 42 toward each other. It can be appreciated that by turning the coil in one direction you can force the top of the opposite sides apart and by turning in the opposite direction, they will be drawn toward each other. Each of the opposite winding of the coil is of sufficient length to enable an end of the framing member to sleeve inside the coil a distance sufficient to provide a strength at this location as great or greater than if the top framing members were continuous and permanently connected at their ends.

The remaining threads act as a bushing or support to help stabilize the ends of the container. Since the threaded portion of the adjusting mechanism is just a helically wound coil, there is sufficient resiliency to allow distortion between the end members whereby the sides may be opened to a considerable degree without affecting the operability of the adjusting mechanism. This would not be true in the case of an ordinary turnbuckle or other oppositely threaded members which would have to be adjusted in the same plane.

When the stacking bars or handle 64 are positioned across the top of the container with the saddles 66 and 68 resting on the top edges 32 and 34, the container is in position to be stacked. As indicated in Figures 1 and 2, when the container is in closed position, as determined by the followers 48 and 50, the side walls 16 and 18 are approximately parallel to each other. When the coil mechanism 52 is turned over and outward against the end of the container, the side walls are forced outwardly as indicated in Figures 3 and 4, and permit the containers to be nestled within each other.

As indicated above, when the stacking bar 64 has been swung in an arc inwardly until the saddles 66 and 68 engage the top edges 32 and 34 of the side walls, the containers will be in condition for stacking, as indicated in Figure 2.

In order to increase the strength of the containers at the ends where the opposed body sections are not joined, the following construction accomplishes this objective. The ends of each half shell 70 and 72 are not parallel to each other but overlap, although each is joined to the bottom of the container. It is to be noticed that the width of each at the top is greater than that at the bottom, so that there is a tapering overlap, with little or none at the bottom increasing to an appreciable overlap at the top.

The ends of the container are cut out at 74 below the coil mechanism sufficiently long and deep to permit of easy operation and handling. To further increase the strength of the container at the points of overlapping, a flat bar 76 is folded over the top edges 74 of the cut-out. The part folded inside the container is of the length of the cut-out and extends into the container an appreciable distance. The ends of this bar 76 is notched at 78 so that the portion folded over on the outside is of greater length than the cut-out and extends an appreciable distance beyond the cut-out on each end. A section of metal 80 with an offset 82 stamped from it of the approximate size and shape as that part of the bar 76 which extends beyond the cut-out is secured to the sides 20 and 22. This construction permits of the movement of the bar as it is effected by the coil operating mechanism to permit inward and outward movement of the two half shells. The construction of this sliding joint adds considerable strength to the overlapping ends of the opposing body parts.

The lower edge of the above described metal offset section 80 is bent outward at approximately 90° to form a nesting stop 82 for the container on each end and will prevent the containers from wedging into each other when in nesting position. This feature is particularly accentuated in Figures 4 and 5.

With reference to the stacking bar or handle 64, it is to be noticed that this bar is straight except for the depressed portions 84 and 86 adjacent the saddles 66 and 68. These portions 84 and 86 are depressed below the top edges 32 and 34 just inside the container and of such size and formation to pocketedly receive the runners 88 and 90, to be later described. This construction permits one container to seat inside the adjacent container when in stacking relationship, and is designed to prevent and eliminate side motion of the stacked containers.

With particular reference to Figure 7, longitudinal runners 88 and 90, preferably of wood, are secured to the bottom of the containers in any well known manner, as by rivets 92. These runners 88 and 90 are located flush with the sides of the containers and are provided with metal strengthening toes 94, the top portion 96 being located in the recess 98. The toes or plates 94 are bent around the ends of the runners 88 and 90 and secured by rivets 92. Endwise movement of the containers, when in stacked relationship, is prevented by the bottom portion of the toe plate 94 pressed into a tapering notch 100 formed in the wooden runners 88 and 90. These notches occur at points where the stacking bars 64 would cross the runners, but on the outside edge of the runners so as to fit over that part of the stacking bars 84 and 86 going from the bottom up to the saddle portions 66 and 68 which rest on the edges of the container.

In Figure 8, a modification is shown wherein oppositely coiled helices 102 are separately formed with the elongations 104 secured to the plate 106 in any well known manner, as by welding. A similar bar or handle 64 is used having a continuous U-shaped coil engaging member 59—60 secured thereto. The coils 102 encircle the horizontal central portion 108 and the ends 110 of each of the helices terminate approximately centrally of the container.

The operation of the expanding or contraction of the sides is similar to that shown in the preferred organization. When the bar or handle members 64 are swung from the outside in a semi-circle, this causes a contraction of the sides 16 and 18 to condition the container for stacking. When the bars 64 are reversed and lie flat against the outer sides, the sides are expanded and present the container for nestling with other similarly conditioned containers.

It should be also appreciated that in the handling of bread, fruit, small packaged goods or any perishable items where deliveries must be quickly made, time and condition of the goods are important factors. The goods must be rapidly removed with the minimum of distortion or marring.

While I have described the containers in detail, it is to be understood that I am not to be limited to size or shape or the selection of materials or that other variations of my invention may be made without departing from the spirit of the invention or scope of the appended claims.

What I claim and desire to secure by Letters Patent is:

1. An adjustable container comprising a pair of complementary shells secured to a bottom wall, each of said complementary shells having a side wall and two end sections, means for moving said shells to and from each other to an open or closed position, said means including a pair of thread followers secured at their ends to said end sections, and a coil having oppositely disposed helix adapted to receive said followers, the ends of said coil attached to a handle, whereby operation of said coil will expand or contract the sides of said container, and means for strengthening the end walls including a reinforcing bar mounted for sliding movement in cut-outs in said end walls.

2. An adjustable container comprising a pair of complementary shells secured to a bottom wall, each of said complementary shells having a side wall and two end sections, means for moving said shells to and from each other to an open or closed position, said means including a pair of thread followers secured at their ends to said end sections, and a coil having oppositely disposed helix adapted to receive said followers, the ends of said coil attached to a handle, whereby operation of said coil will expand or contract the sides of said container, and means for strengthening the end walls including a reinforcing bar mounted for sliding movement in cut-outs in said end walls, and means for securing the side walls of said container in closed position to permit stacking of said container atop a similar container including side wall engaging means secured to said handle.

3. An adjustable container comprising a pair of complementary shells secured to a bottom wall, runners having notches therein, each of said complementary shells having a side wall and two end walls, each of said end walls arranged in overlapping relationship, means for moving said shells to and from each other to an open or closed position, said means including a pair of thread followers secured at their ends to said end sections and a coil having oppositely wound helix adapted to receive said followers, the ends of said coil attached to a handle, whereby operation of said handle will expand or contract the sides of said container, means for strengthening the end walls including a reinforcing bar mounted for sliding movement in cut-outs in said end walls, means for securing the side walls of said container in closed or stacking position to permit stacking of said container atop a similar container, and means for preventing endwise movement of said stacked containers comprising said notched runners.

4. An adjustable container comprising a pair of complementary shells secured to a bottom wall, runners having notches therein, each of said complementary shells having a side wall and two end walls, each of said end walls arranged in overlapping relationship, means for moving said shell to and from each other to an open or closed position, said means including a pair of thread followers secured at their ends to said end sections and a coil having oppositely wound helix adapted to receive said followers, the ends of said coil attached to a handle whereby operation of said handle will expand or contract the sides of said container, means for strengthening the end walls including a reinforcing bar mounted for sliding movement in cut-outs in said end walls, said container adapted to be nestled into a similar container when in open positions, and means for preventing wedging of said containers comprising stops located on said end walls adapted to rest on the top edges of the container immediately below.

5. An adjustable container comprising a pair of complementary shells secured to a bottom wall, runners having notches therein, each of said complementary shells having a side wall and two end walls, each of said end walls arranged in overlapping relationship, means for moving said shells to and from each other to an open or closed position, said means including a pair of thread followers secured at their ends to said end sections and a coil having oppositely wound helix adapted to receive said followers, the ends of said coil attached to a handle having depressed portions thereon, whereby operation of said handle will expand or contract the sides of said container, means for strengthening the end walls including a reinforcing bar mounted for sliding movement in cut-outs in said end walls, means for securing the side walls of said container in closed or stacking position to permit stacking of said container atop a similar container, and means for preventing endwise movement of said stacked containers comprising said notched runners, and said depressed portions adapted to receive runners of the adjacent container and prevent side motion of the two containers with respect to each other.

6. An adjustable container comprising an elongated, box-like structure having a framing member extending substantially around the upper perimeter, a bottom having runners secured to the lower edges of the side and end members forming said container, each of said end members arranged in overlapping relationship, the upper portions of said end members partially attached to said framing members, means on said end members operatively connected to said framing member for adjusting the side walls from a parallel position to downwardly converging positions, said means comprising a pair of oppositely wound helix mounted on the ends of said framing member and centrally of said end members whereby said container is adjusted to closed or open position, and means for strengthening said end members comprising a reinforcing bar slidably mounted in cut-outs in said end members whereby said end members are maintained in parallel relationship.

CHARLES W. TURBYFILL.

REFERENCES CITED

The following references are of record in the file of this patent:

UNITED STATES PATENTS

| Number | Name | Date |
|---|---|---|
| 311,951 | Bright | Feb. 10, 1885 |
| 1,120,955 | Martin | Dec. 15, 1914 |
| 1,124,875 | Dischmarcer | Jan. 12, 1915 |
| 1,302,253 | Wallace | Apr. 29, 1919 |
| 1,845,842 | Kamenstein | Feb. 16, 1932 |
| 2,224,818 | Hovorka | Dec. 10, 1940 |
| 2,395,542 | Fordon | Feb. 26, 1946 |
| 2,410,216 | Insoll | Oct. 29, 1946 |
| 2,513,693 | Turbyfill | July 4, 1950 |